United States Patent
Bobrov et al.

(10) Patent No.: US 6,846,522 B1
(45) Date of Patent: Jan. 25, 2005

(54) DECORATIVE MATERIAL AND METHOD OF ITS FABRICATION

(75) Inventors: Yuri A. Bobrov, Moscow (RU); Leonid Y. Ignatov, Moscow (RU); Ir Gvon Khan, Moscow (RU)

(73) Assignee: Optiva, Inc., South San Francisco, CA (US)

( * ) Notice: Subject to any disclaimer, the term of this patent is extended or adjusted under 35 U.S.C. 154(b) by 0 days.

(21) Appl. No.: 09/407,218

(22) Filed: Sep. 27, 1999

(Under 37 CFR 1.47)

(51) Int. Cl.[7] .............................. G02B 5/30; G02F 1/13; G02F 1/3335
(52) U.S. Cl. ........................... 428/1; 428/543; 428/900; 428/913
(58) Field of Search ................................ 428/34.1, 913, 428/13, 543, 900

(56) References Cited

U.S. PATENT DOCUMENTS

| | | | |
|---|---|---|---|
| 2,400,877 A | | 5/1946 | Dreyer .......................... 88/65 |
| 3,965,030 A | * | 6/1976 | Jones et al. .................. 252/299 |
| 4,110,004 A | | 8/1978 | Bocker ................. 350/162 SF |
| 5,247,377 A | | 9/1993 | Omeis et al. ................. 359/76 |
| 5,438,421 A | | 8/1995 | Sugawara et al. ............ 359/75 |
| 5,528,400 A | * | 6/1996 | Arakawa ..................... 359/73 |
| 5,534,209 A | | 7/1996 | Moriya ................. 254/171.13 |
| 5,607,732 A | | 3/1997 | Miyamoto et al. ............. 428/1 |
| 5,699,136 A | | 12/1997 | Arakawa et al. ............ 349/118 |
| 5,706,131 A | | 1/1998 | Ichimura et al. ............ 359/490 |
| 5,738,918 A | | 4/1998 | Shen et al. .................... 428/1 |
| 5,747,121 A | | 5/1998 | Okazaki et al. ................ 428/1 |

FOREIGN PATENT DOCUMENTS

| | | | | |
|---|---|---|---|---|
| CA | WO-9115800 | * | 10/1991 | ......... G02F/1/1333 |
| DE | 43 39 395 | | 5/1994 | ......... G02F/1/1333 |
| EP | 0 0961138 A1 | * | 12/1999 | |
| JP | 1-183602 | | 7/1989 | ............ G02B/5/30 |
| JP | 4-307300 | | 10/1992 | ............. B44C/1/28 |
| RU | WO 99/31535 | * | 6/1999 | |
| SU | 1015326 A | | 4/1983 | ............ G02B/5/30 |
| WO | WO 91/15800 | | 10/1991 | ......... G02F/1/1333 |
| WO | WO 94/28073 | | 12/1994 | ......... C09B/31/147 |
| WO | WO 96/26462 | * | 8/1996 | |

OTHER PUBLICATIONS

Derwent abstract Acc. No. 1999–600961; WeekL 20172 "Light Polarizer for e.g. Liquid Crystal Display" Oct. 2, 2001.*

* cited by examiner

Primary Examiner—Sandra M. Nolan
(74) Attorney, Agent, or Firm—Dorsey & Whitney LLP

(57) ABSTRACT

A decorative material is disclosed which comprises two polarizers and at least one phase-shifting plate placed between the polarizers. Each polarizer has a controlled direction of polarization axis. The phase-shifting plate represents a continuous layer of an optically anisotropic material containing regions differing by optical properties.

16 Claims, 1 Drawing Sheet

DECORATIVE MATERIAL AND METHOD OF ITS FABRICATION

The invention refers to the field of fabrication of decorative materials and stained-glass windows on the basis of optical effects in polarized light and can be used in decorative art, advertising, and for the production of show windows, decorative screens, etc.

As is known, the polarized light is capable of producing a number of optical effects that can be used for various purposes. For example, a polarizer is able to modify the intensity of transmitted polarized light depending on the mutual orientation of the polarization plane of light and the polarization axis. This ability is used for the formation of images in indicators and other information display devices based on liquid crystals.

Another optical effect, which appears when an anisotropic nonabsorbing film is placed between crossed polarizers, can be used for the obtaining of iridescent colors. In this case, a nontransparent state of the polarizers is changed for clarification and the system acquires interference colors depending on the orientation of the anisotropic film and the viewing angle. This phenomenon can be used for the production of decorative images and stained glass windows. For example, invention [1] offered a decorative color material having a sandwich structure, including a glass substrate, an optically transparent film, and a phase-shifting plate or a polarizing plate on which fragments of the phase-shifting plate (having properly selected colors and cut according to a designed pattern) are glued to form a mosaic. This sandwich structure is confined between layers of polarizing plates. When the light is transmitted through this structure, each element of the mosaic acquires certain color depending on the viewing angle. Rotation of the polarizers or variation of the viewing angle will change the color of each element in the mosaic.

A disadvantage of the known material is that it consists of separate elements cut from an optically anisotropic transparent film so as to have certain orientations. This implies considerable difficulties in the production of this material, since the process of cutting, assembling, and fixing the elements of mosaic involves manual low-productivity operations significantly increasing the costs of such decorative glasses.

The purpose of the present invention was to create a decorative material comprising a continuous optically anisotropic film and to simplify the production technology so as to exclude the labor-consuming stages of the decorative glass fabrication involving cutting individual elements for a mosaic from an optically anisotropic material, assembling the pattern, and fixing the mosaic on a substrate.

This task was solved by forming a mosaic structure of the decorative material either by inducing local changes in the optical properties of an initially homogeneous anisotropic or isotropic film or by depositing a polarization coating onto an optically homogeneous anisotropic transparent film. The polarization axis of the coating varies in a preset manner so as to form the required mosaic pattern.

Let us consider in more detail the physical backgrounds of the proposed solution. The interference phenomena in the polarizer—birefringent transparent film—polarizer system appear because the light beam in the birefringent plate splits into ordinary and extraordinary rays that interfere with each other upon exit from the film to form an elliptically polarized beam. The shape of the polarization ellipse and the orientation of its axes depend on the optical phase shift between ordinary and extraordinary rays at the exit from the birefringent film and on the orientation of the polarization plane of the incident light beam relative to the principal directions (axes) of the refractive index of the film. The orientation of the polarization plane is determined by angles between the axes of the refractive index ellipsoid and the polarization axis. The phase shift is given by the expression:

$$\delta = (n_e - n_o) d / \cos \Psi,$$

where $n_e$ and $n_o$ are the refractive indices of ordinary and extraordinary rays, d is the film thickness, and $\Psi$ is the angle between the light beam propagating in the film and the normal to the film plane. The shape of the polarization ellipse may change from circular ($\delta = \lambda/4$) to linear ($\delta = \lambda/2, \lambda$) and the angles between the long axis of the ellipse and the principal axes of the refractive index tensor may vary, from 0 to 90°. When the polarization plane of light is oriented at 45° relative teethe axes of optical anisotropy of the phase-shifting film and $\delta = \lambda/2$, the phase-shifting film rotates the polarization plane of the incident light by 90°. As a result, the beam will pass without attenuation through the second polarizer occurring in the crossed position with respect to the first polarizer. If $\delta = \lambda$, the polarization plane orientation will remain unchanged and the light will be blocked by the second polarizer. For intermediate $\delta$ values, the light with elliptic polarization will be partly transmitted through the second crossed polarizer. Because the refractive indices $n_o$ and $n_e$ depend on the wavelength, the conditions $\delta = \lambda/2$ and $\delta = \lambda$ will be satisfied only for a definite light wavelength. Therefore, if the light is nonmonochromatic, the optical system polarizer—birefringent transparent film—polarizer acquires certain color that changes depending on the viewing angle. The color will also depend on the d and $\Psi$ values. As is seen from formulas (1) and (2), a mosaic pattern can be formed by changing one of the parameters determining the shape or orientation of the polarization ellipse of the transmitted light wave: $n_e$, $n_o$, d, $\Psi$.

An important distinguishing feature of the proposed solution is that the decorative material is based on either an anisotropic film with varying optical properties, placed between two polarizers, or an anisotropic film with homogeneous optical properties, onto which a polarization coating with variable polarization axis orientation is deposited from one or both sides.

Anisotropic films with variable optical properties are formed by embossment or a local thermal treatment of the initially anisotropic film. Another method consists in covering a substrate with a thin film of a substance in which molecules, having no principal absorption bands in the visible range, can acquire a preset orientational order.

A polarization coating with variable orientation of the polarization axis can be formed by known methods described in patents 2 to 4.

Embossing of a homogeneous anisotropic film creates regions with different thicknesses that provide a differential phase shift and, hence, various coloration of these regions. In order to ensure that two neighboring mosaic elements, having refractive indices differing by $\Delta n = 0.01$, would appear as differently colored, the film thicknesses in these regions must differ by 1–3 $\mu$m.

The embossing technology is based on pressing a polymeric film between two surfaces of a press mold, one or both bearing a desired pattern engraved on the surface. Another method of embossing consists in rolling a polymeric film between two cylinders. The desired pattern is engraved on the surface of one or both rollers. The mold or roller engraving consists in creating a depression (0.1 to 10 $\mu$m deep) along the periphery of the pattern, which can be produced by chemical or electrochemical etching, depositing a metal film, mechanical engraving, or by any other known method. When the patterns are made on both surfaces of the press molt or rollers, the contours may either coincide or not. For the same contour shapes, both patterns can represent protruding or recessing elements; it is also possible that elements on one surface are made as protrusions, while the opposite mold surface has the same elements in the form of recessions, whereby the two surfaces are fitting one another in the course of embossing to form different gaps in the neighboring regions. In order to facilitate the process of embossing, the rollers (or the press mold) are heated to a softening temperature of the polymeric film. In order to level the film surface after the process and to restore a uniform film thickness, while retaining local changes in the optical path length, the surface of the anisotropic film is coated with an isotropic layer of a lacquer or polymer.

Variation of the optical properties of an anisotropic film by local heating can be performed by directly or indirectly touching the surface with a tool heated to the required temperature, or by treating the surface with a torch flame, or by blowing it with a hot gas stream.

Anisotropic optically transparent layers with homogeneous or variable optical properties are obtained by depositing thin films of molecularly oriented substances onto an isotropic substrate. For this purpose we may use compounds or their solutions that can occur in a liquid-crystalline (LC) state, such as low-molecular-mass liquid crystals having melting points above the ambient temperature, LC polymers [5], or some other low-molecular-mass substances capable of forming elongated molecular aggregates in solution [2].

Besides the dyes [2], the anisotropic layers transparent to visible light can be obtained using aqueous or aqueous-organic solutions of aromatic compounds absorbing in the spectral range below 400 nm, which can be selected among organic and inorganic salts of alkylbenzene sulfonates, sulfonic acids of the naphthalene series, mono- and polysulfonic acids of the derivatives of benzoimidazole and benzothiazole, anthraquinone, phenanthrene, amino-, hydroxy-, halido-, nitro-, and alkylanthraquinones, benzanthrone, 3-bromobenzanthrone, and water-soluble organic belofores and bleaching agents.

The LC films are deposited by known methods described in detail in patents 2 and 3, based on the squeegee, die, and roller techniques. In these technologies, the process of LC solution deposition is accompanied by orientation of the molecules under the action of viscous forces developed in the course of deposition due to stretching of the liquid layer, shifting one layer relative to another, or specially treating the surface to render it anisotropic. For depositing liquid crystals occurring in the solid state under usual ambient conditions, the compounds are preliminarily transformed into an LC state by heating to the melting temperature. All these techniques can be used to obtain elements with different thicknesses. For this purpose, a stepped, wedge-shaped, or other relief with depth variations within 1–15 μm is formed on the surface of the application device. In order to obtain a mosaic structure with differential orientation of optical axes in the anisotropic layer, the application device (die or squeegee) must perform reciprocating motions in the direction perpendicular to the direction of motion of the base to which the anisotropic film is applied. In the case of roller technology, this is achieved by producing a relief of elongated grooves, making certain angle with the cylinder generating line, on the surface of rollers. These grooves render the roller surface anisotropic and provide the orientation of molecules in a desired direction.

An alternative method of obtaining anisotropic films with variable direction of optical axes and differential refractive indices is based on the known method of inducing the optical anisotropy by directional photopolymerization or simply irradiating a polymeric film on a substrate with polarized light [6].

A decorative material with interference-colored mosaic structure can be also obtained using a single polarizer. In this case, the rear polarizer is replaced by a mirror- or diffuse-reflecting surface layer. This layer is obtained by depositing a film of aluminum or some other high-reflectance material or by gluing a reflecting metal foil, mirror, or some other reflecting film. A polarizer is fastened on the opposite side of the structure.

In order to obtain original optical effects, the anisotropic film can be given a certain shape and fastened on a transparent object having a preset density. All this system is placed inside a closed volume filled with a transparent liquid, e.g., water or an organic solvent, so that the anisotropic film and the base object would be immersed in the liquid. The polarizers are glued onto the outer surface of the vessel. When viewed through the walls of the vessel with glued polarizers, motions of the object carrying the anisotropic film will produce an interplay of colors. The base with preset density can be a hollow object made of glass, plastic, or some other transparent material.

The structure of the decorative material is depicted in more detail in FIGS. 1–4, and the methods of its fabrication are illustrated in FIG. 5.

FIG. 1 shows a decorative material in which the mosaic effect is due to the differential thickness of neighboring regions in an anisotropic film 1. The anisotropic film is placed between two polarizers 2 whose polarization axes can be oriented at an arbitrary angle, although the most pronounced effect is achieved for 90°. In order to improve the optical properties and consolidate the structure, one or both polarizers can be glued onto the anisotropic film 1. The structure is protected from the action of ambient factors by glass plates 3 or by some other rigid transparent material 4, mechanically fastened or glued on one or both sides. The durability of polarizers and anisotropic film can be further increased by application of a film. 5 absorbing in the UV and IR spectral ranges.

FIG. 2 shows a decorative material in which the anisotropic film is represented by a molecularly ordered layer 1 of a compound, transparent in the visible range, deposited onto an isotropic substrate 6. The mosaic effect is ensured by differential orientation of optical axes of the neighboring elements. All other parts of the structure are the same as in FIG. 1.

Figure 5:
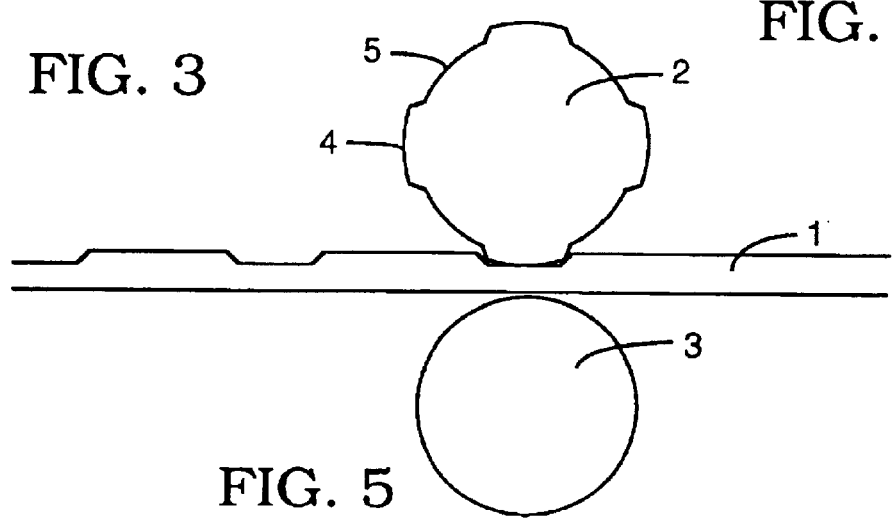

FIG. 5 illustrates the method of embossing used for the obtaining of an optically anisotropic film. Anisotropic film 1 with uniform thickness is rolled between rotating cylinders 2 and 3 whose surfaces contain recessions 4 and protrusions 5 forming the regions of differential thickness. In order to render plastic properties to the polymeric film 1, the rollers are heated to a temperature close to the melting temperature of the polymer.

Figure 1:
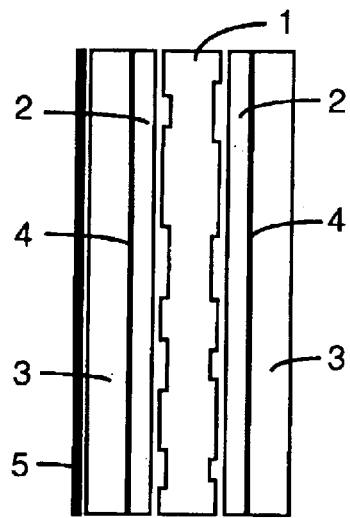
Figure 2:
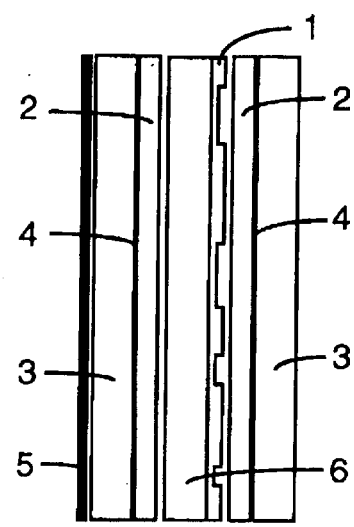
Figure 3:
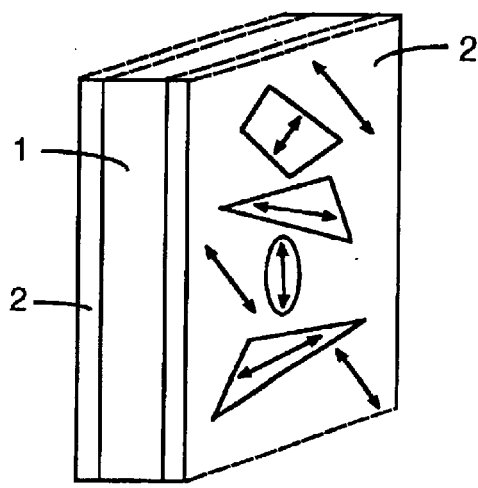
FIG. 3 shows a decorative material in which the optically anisotropic film has otherwise homogeneous properties and the mosaic effect is achieved by placing polarization coatings 2 onto both sides of the anisotropic film. One or both of these coatings have different directions of the polarization axes in the neighboring mosaic elements.
Figure 4:
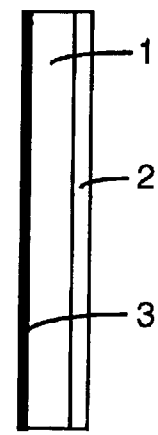
FIG. 4 shows a decorative material with a reflecting layer 3 replacing one of the polarizers.

The interaction of a decorative element with transmitted light is illustrated as follows. The light beam 1 (FIG. 1)

passes through polarizer 2 and strikes the phase-shifting plate 3. Each element of the mosaic pattern splits the incident light into ordinary and extraordinary rays propagating with different velocities. Because the mosaic elements have different thicknesses, each of them produces its own phase shift between the ordinary and extraordinary rays As a result, all beams at the exit from the phase-shifting plate will have different ellipticity that accounts for the differential light transmission through the second polarizer. For a nonmonochromatic light, this will also lead to different colors of the mosaic elements. In a mosaic characterized by different orientations of optical axes in the neighboring elements (FIG. 2), the polarized light beams passing through the neighboring elements will have different orientations of the axes of polarization ellipse, which will also result in a different attenuation of the light flux transmitted through the second polarizer. If the mosaic effect is produced by a mosaic distribution of polarization axes in one of the polarizers (FIG. 3), a homogeneously polarized light passing through polarizer 2 strikes the phase-shifting plate 1 and homogeneously changes its polarization over the entire area of the decorative plate. When the light passes through the second polarizer 3, in which the neighboring mosaic elements have different directions of the polarization axes, the beam will be differently attenuated in each element, thus acquiring different colors. A decorative material with reflecting layer (FIG. 4) acts similarly to the system with two polarizers. The light passes through the polarizer and is doubly transmitted through the anisotropic medium, being reflected from the rear surface. As a result, the light beam passing through each mosaic element acquires the corresponding phase shift and leaves the system through the same polarizer, which acts as the second polarizer upon the output light beam.

As is seen from the above description, the proposed solution allows us to obtain a decorative material comprising a continuous optically transparent material, rather than separately cut mosaic elements, which markedly simplifies the production technology.

Information Sources Used for the Application

1. JP No. 4-307300(A), Oct. 29, 1992
2. Appl. PCT WO 94/28073; Published Dec. 8, 1994
3. U.S. Pat. No. 2,400,877, May 28, 1946.
4. JP No. 1-183602(A), Jul. 21, 1989
5. U.S. Pat. No. 5,247,377, Sep. 21, 1993
6. SU No. 1015326, Jan. 25, 1982

We claim:

1. A decorative material, comprising:
    two polarizers, wherein each polarizer has a controlled direction of polarization axis; and
    at least one phase-shifting plate placed between the polarizers, wherein the phase-shifting plate represents a continuous layer of an optically anisotropic material containing regions differing by optical properties.

2. The decorative material of claim 1, wherein the optically anisotropic material represents a molecularly oriented film deposited onto an optically isotropic base.

3. A decorative material, comprising:
    two polarizers, wherein each polarizer has a controlled direction of polarization axis, and at least one of the polarizers contains several elements differing by directions of their polarization axes; and
    at least one phase-shifting plate placed between the polarizers, wherein the phase-shifting plate represents a continuous layer of a homogeneous optical anisotropic material.

4. The decorative material of claim 1 or 3, wherein the anisotropic film is placed in a transparent vessel filled with a transparent or weakly colored liquid medium, and the polarizers are placed in the inner surface of the vessel.

5. The decorative material of claim 1 or 3, wherein the anisotropic film is placed in a transparent vessel filled with a transparent or weakly colored liquid medium, and the polarizers are placed in the outer surface of the vessel.

6. The decorative material of claim 3, wherein at least one of the polarizers represents a film of molecularly oriented organic substance deposited immediately onto an optically anisotropic material.

7. The decorative material of claim 3, wherein at least one of the polarizers represents a film of molecularly oriented organic substance deposited onto a transparent sublayer predeposited onto a surface of an anisotropic material.

8. The decorative material of claim 6 or 7, wherein the molecularly oriented film represents a layer of an organic substance formed from lyotropic liquid crystals.

9. The decorative material of claim 6 or 7, wherein the molecularly oriented film represents a layer of an organic substance formed from thermotropic liquid crystals having a temperature of transition from solid to liquid crystal state above the ambient temperature.

10. The decorative material of claim 1, wherein the continuous layer of the optically anisotropic material contains regions differing by value of phase shift.

11. The decorative material of claim 1, wherein the continuous layer of the optically anisotropic material contains regions differing by direction of optical axis.

12. The decorative material of claim 1, wherein the continuous layer of the optically anisotropic material contains regions differing by value of phase shift and direction of optical axis.

13. A decorative material, comprising:
    a polarizer having a controlled direction of polarization axis;
    a reflecting layer; and
    at least one phase-shifting plate placed between the polarizer and the reflecting layer, wherein the phase-shifting plate represents a continuous layer of an optically anisotropic material containing regions differing by optical properties.

14. The decorative material of claim 13, wherein the continuous layer of the optically anisotropic material contains regions differing by value of phase shift.

15. The decorative material of claim 13, wherein the continuous layer of the optically anisotropic material contains regions differing by direction of optical axis.

16. The decorative material of claim 13, wherein the continuous layer of the optically anisotropic material contains regions differing by value of phase shift and direction of optical axis.

* * * * *